US012580422B2

(12) United States Patent
Sekiya et al.

(10) Patent No.: US 12,580,422 B2
(45) Date of Patent: Mar. 17, 2026

(54) INVERTER CIRCUIT AND WIRELESS POWER TRANSFER CIRCUIT

(71) Applicant: NATIONAL UNIVERSITY CORPORATION CHIBA UNIVERSITY, Chiba (JP)

(72) Inventors: Hiroo Sekiya, Chiba (JP); Wenqi Zhu, Chiba (JP)

(73) Assignee: NATIONAL UNIVERSITY CORPORATION CHIBA UNIVERSITY, Chiba (JP)

( * ) Notice: Subject to any disclaimer, the term of this patent is extended or adjusted under 35 U.S.C. 154(b) by 0 days.

(21) Appl. No.: 18/865,296

(22) PCT Filed: May 10, 2023

(86) PCT No.: PCT/JP2023/017590
§ 371 (c)(1),
(2) Date: Nov. 12, 2024

(87) PCT Pub. No.: WO2023/219107
PCT Pub. Date: Nov. 16, 2023

(65) Prior Publication Data
US 2025/0309689 A1　Oct. 2, 2025

(30) Foreign Application Priority Data
May 13, 2022　(JP) ................................. 2022-079500

(51) Int. Cl.
*H02J 50/12* (2016.01)
*H02M 7/48* (2007.01)

(52) U.S. Cl.
CPC ........... *H02J 50/12* (2016.02); *H02M 7/4815* (2021.05); *H02J 2207/20* (2020.01)

(58) Field of Classification Search
CPC ..... H02J 50/12; H02J 2207/20; H02M 7/4815
See application file for complete search history.

(56) References Cited

U.S. PATENT DOCUMENTS

| | | | | | |
|---|---|---|---|---|---|
| 4,785,387 A | * | 11/1988 | Lee | ........................ | H02M 3/337 |
| | | | | | 363/131 |
| 5,313,382 A | * | 5/1994 | Farrington | ............ | H02M 3/158 |
| | | | | | 363/16 |

(Continued)

FOREIGN PATENT DOCUMENTS

| | | | | | |
|---|---|---|---|---|---|
| JP | | 2021530946 A | * 11/2021 | ............... | G06N 5/04 |
| JP | | 2021191111 A | 12/2021 | | |
| WO | WO-2019229217 A1 | * 12/2019 | | .............. | H02J 50/10 |

*Primary Examiner* — Daniel Cavallari
*Assistant Examiner* — Michael J Warmflash
(74) *Attorney, Agent, or Firm* — HAYES SOLOWAY P.C.

(57) ABSTRACT

An inverter circuit includes an input inductor connected in series between a direct-current power supply and a switching element partially constituting the inverter circuit, a high-frequency resonant circuit that includes a high-frequency resonant capacitor and a high-frequency resonant inductor and is connected in parallel to a switching element, and a switch having one end connected to the direct-current power supply and the other end connected to the high-frequency resonant capacitor and the high-frequency resonant inductor. The input inductor is connected in parallel to the high-frequency resonant inductor and the switch.

4 Claims, 10 Drawing Sheets

(56) References Cited

U.S. PATENT DOCUMENTS

| 8,513,854 B1 * | 8/2013 | Nerone | .................. | F04D 33/00 |
| | | | | 310/317 |
| 2012/0169137 A1 * | 7/2012 | Lisi | ......................... | H02J 50/40 |
| | | | | 307/104 |
| 2015/0091379 A1 * | 4/2015 | Uchida | .................. | H02J 50/80 |
| | | | | 307/104 |
| 2016/0013663 A1 * | 1/2016 | Zhang | .................... | H02J 50/12 |
| | | | | 307/104 |
| 2017/0229921 A1 * | 8/2017 | Hwang | ................ | H03F 3/3015 |
| 2021/0203187 A1 * | 7/2021 | Mishima | ................ | H02J 50/12 |
| 2024/0339866 A1 * | 10/2024 | Mishima | ................ | H02J 50/12 |

* cited by examiner

WHEN CHANGEOVER SWITCH 19 IS TURNED ON

INPUT INDUCTANCE (Infinite choke)	$L_C >> L_2$

CONSTANT OUTPUT VOLTAGE
(INDEPENDENT OF LOAD)

(HIGH-FREQUENCY RESONANT CIRCUIT)

Fig.5

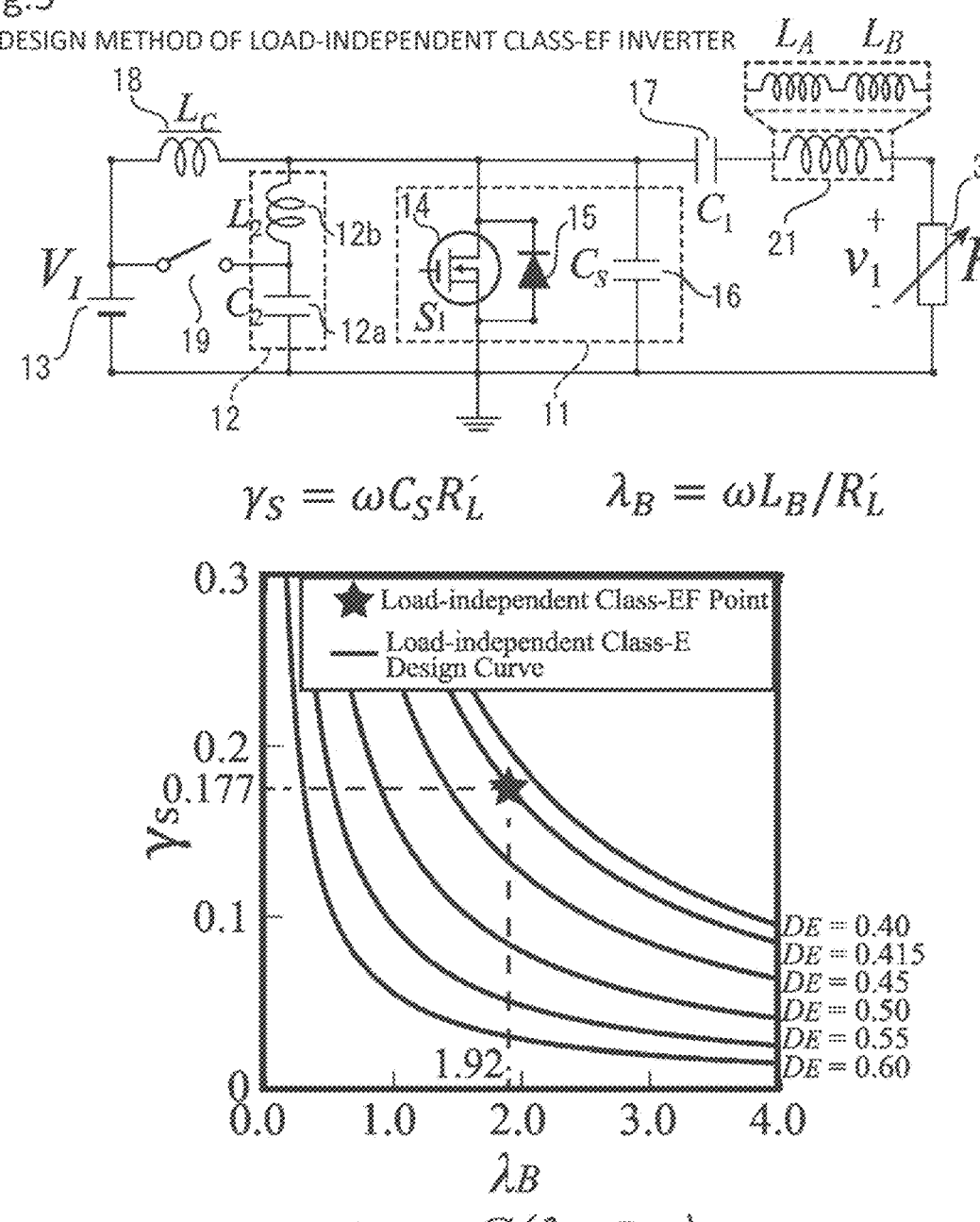

DESIGN METHOD OF LOAD-INDEPENDENT CLASS-EF INVERTER $$\gamma_S = \omega C_S R_L' \qquad \lambda_B = \omega L_B / R_L'$$

$$\gamma_S = G(\lambda_B, D_E).$$

DETERMINE DUTY RATIO OF LOAD-INDEPENDENT CLASS E

| PARAMETER | DEFINITION | DESIGN VALUE |
|---|---|---|
| $D_E$ | $S_1$ On-duty ratio(class-E) | 0.415 |
| $\gamma_S$ | $\omega C_S R_{LEF}$ | 0.177 |
| $\lambda_B$ | $\omega L_B / R_{LEF}$ | 1.92 |
| $\omega_2$ | $1/(\omega\sqrt{L_2 C_2})$ | 1.66 |
| $D_{EF}$ | $S_1$ On-duty ratio(class-E/F) | 0.300 |

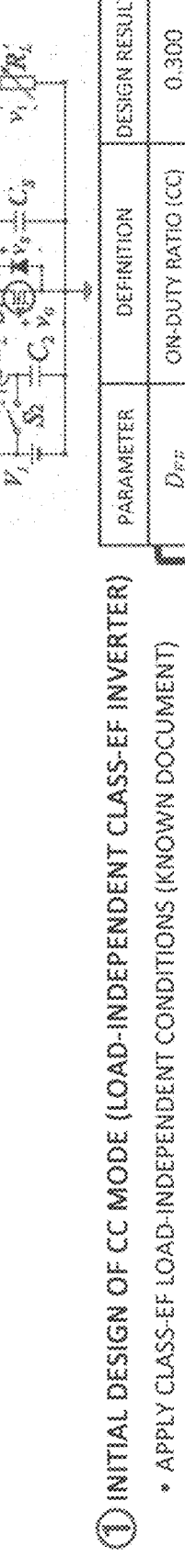
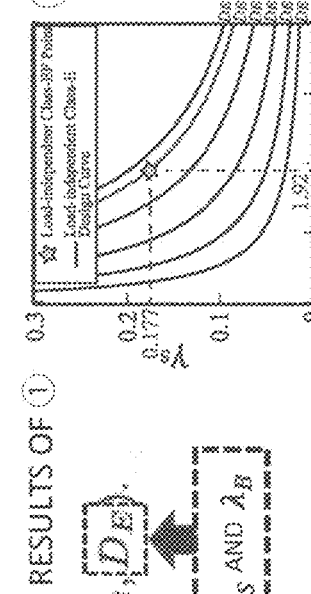
Fig. 6

Element Values

| Param. | Designed | Measured | Difference |
|--------|----------|----------|------------|
| $f_S$ | 1.00 MHz | 1.00 MHz | 0.00 % |
| $V_1$ | 24.0 V | 24.0 V | 0.00 % |
| $L_C$ | 100.0 μH | 99.2 μH | -0.80 % |
| $L_1$ | 11.9 μH | 11.9 μH | 0.00 % |
| $L_2$ | 3.24 μH | 3.25 μH | +0.30 % |
| $C_S$ | 5.50 nF | 5.50 nF | 0.00 % |
| $C_1$ | 2.43 nF | 2.42 nF | -0.41 % |
| $C_2$ | 2.70 nF | 2.68 nF | +0.74 % |

MODIFICATION EXAMPLE

EXAMPLE ACCORDING TO RELATED ART

INVERTER CIRCUIT AND WIRELESS POWER TRANSFER CIRCUIT

TECHNICAL FIELD

The present invention relates to an inverter circuit, for example, an inverter circuit that converts direct-current power into alternating-current power and a wireless power transfer circuit, for example, a wireless power transfer circuit that performs wireless power transfer using the alternating-current power converted by the inverter circuit.

BACKGROUND ART

In recent years, with the spread of mobile phones and the like operated by power of rechargeable secondary batteries, wireless power transfer (WPT) that supplies charging power for these secondary batteries in a non-contact manner has attracted attention from the viewpoint of improving user convenience. In the wireless power transfer (WPT), it is necessary to use radio waves with a frequency of 6.7 MHz, 13.5 MHz, or the like in an industrial, scientific, and medical frequency band (ISM band) which is higher than that in the related art. Therefore, in order to perform power control at these high frequencies with high efficiency, the use of a resonant converter using an inverter circuit is considered, instead of the use of a square wave (PWM) converter according to the related art (for example, see Patent Citation 1).

CITATION LIST

Patent Literature

Patent Citation 1: JP 2021-191111 A

SUMMARY OF INVENTION

Technical Problem

The secondary batteries to be powered by the wireless power transfer (WPT) include secondary batteries that switch from constant current charging to constant voltage charging in order to, for example, prevent deterioration of the batteries due to heat generation or the like, such as lithium-ion batteries widely used in mobile devices including mobile phones, and secondary batteries that are always charged only by the constant current charging or the constant voltage charging. The resonant converter using the inverter circuit corresponding to the high frequencies described in Patent Citation 1 has a problem in that it is not possible to perform both constant current supply corresponding to the constant current charging and constant voltage supply corresponding to the constant voltage charging.

The present invention has been made in view of the above problems, and an object of the present invention is to provide an inverter circuit and a wireless power transfer circuit that enables both constant current supply and constant voltage supply.

Solution to Problem

In a first aspect of the present invention, there is provided an inverter circuit that is connected to a direct-current power supply and converts direct-current power output from the direct-current power supply into alternating-current power, including: an input inductor connected in series between the direct-current power supply and a switching circuit partially constituting the inverter circuit; a resonant circuit connected in parallel to the direct-current power supply together with the switching circuit, the resonant circuit including a resonant capacitor and a resonant inductor; and a switch having a first end connected to the direct-current power supply and a second end connected to the resonant capacitor and the resonant inductor, in which the resonant inductor and the input inductor are connected in parallel to the switch. According to the first aspect, the switch can be turned on and off to perform both constant current supply and constant voltage supply using one inverter circuit.

In a second aspect of the present invention, the inverter circuit according to the first aspect is further defined such that an inductance of the resonant inductor is smaller than an inductance of the input inductor, and a constant of each element constituting the inverter circuit is optimized such that constant current supply and constant voltage supply are possible without depending on a fluctuation in a power load supplied with the alternating-current power output from the inverter circuit. According to the second aspect, for example, the inductance of the resonant inductor is set to a sufficiently small value that is equal to or less than one tenth of the inductance of the input inductor. Therefore, it is possible to perform constant current supply and constant voltage supply that do not depend on load fluctuations, without adding a new control mechanism, and to simplify a circuit configuration for performing control corresponding to the load fluctuations.

In a third aspect of the present invention, there is provided a wireless power transfer circuit including: the inverter circuit according to the second aspect; and a power transfer circuit transferring power in a disconnected state using magnetic field resonance or electric field resonance. According to the third aspect, the switch can be turned on and off to perform both constant current supply and constant voltage supply using one wireless power transfer circuit while simplifying a circuit configuration for performing control corresponding to load fluctuations.

BRIEF DESCRIPTION OF DRAWINGS

FIG. 5 is a diagram illustrating a method for setting a load-independent Class-EF inverter (Class-E/F inverter).

FIG. 6 is a diagram illustrating a design procedure for the inverter circuit according to the present invention.

FIG. 9 is a circuit diagram illustrating a wireless power transfer circuit to which an inverter circuit according to a modification example is applied.

DESCRIPTION OF EMBODIMENTS

A mode for implementing a wireless power transfer circuit to which an inverter circuit according to the present invention is applied will be described below with reference to the drawings. However, in this embodiment, for the sake of convenience, electrical elements are denoted by Arabic numerals, and characteristics and abbreviations of the electrical elements are written in parentheses.

Figure 1:
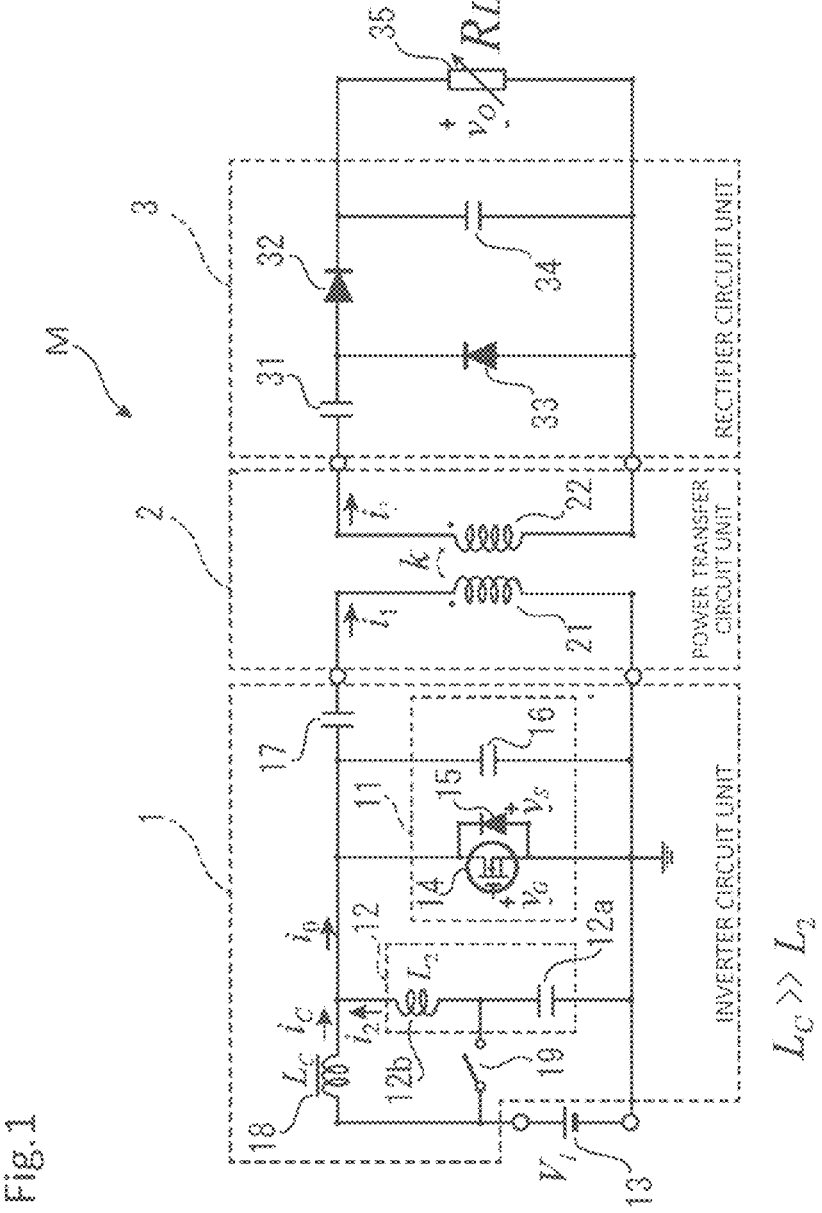
FIG. 1 is a circuit diagram illustrating a wireless power transfer circuit to which an inverter circuit according to the present invention is applied.

FIG. 1 is a circuit diagram illustrating an example of a wireless power transfer circuit M to which the inverter circuit according to the present invention is applied. As illustrated in FIG. 1, the wireless power transfer circuit M to which the inverter circuit according to the present invention is applied is a circuit unit that mainly transfers power in a disconnected state using magnetic field resonance and includes a power transfer circuit unit 2 composed of a pair of electromagnetic coils of a power transmitting coil (L1) 21 and a power receiving coil (L3) 22, an inverter circuit unit 1 that supplies alternating-current power with a predetermined frequency to the power transmitting coil (L1) 21, and a rectifier circuit unit 3 that converts the alternating-current power received by the power receiving coil (L3) 22 into direct-current power and supplies the direct-current power to a power load (RL) 35.

However, the power load (RL) 35 is, for example, a secondary battery charged with direct-current power, and an object whose load (resistance) is changed in time series when being supplied with the direct-current power is assumed as the power load (RL) 35. However, the power load (RL) 35 is not limited to the secondary battery.

Known electromagnetic coils can be used as the power transmitting coil (L1) 21 and the power receiving coil (L3) 22 used in the power transfer circuit unit 2. The power transmitting coil (L1) 21 and the power receiving coil (L3) 22 may be appropriately selected depending on the magnitude of power required for transfer, a frequency used for transfer, a transfer distance, and the like. In particular, as disclosed in JP 2021-191111 A, which is cited as a prior art document, a matching circuit may be provided such that the Poincaré length is the shortest length.

In addition, the rectifier circuit unit 3 may be any circuit unit that can convert the alternating-current power received by the power receiving coil (L3) 22 into direct-current power and stably supply the direct-current power to the power load (RL) 35. As illustrated in FIG. 1, a known Class-D rectifier as a passive circuit composed of a diode (D2) 33 and a capacitor (CF) 34 that are connected in parallel to the load and a capacitor (C3) 31 and a diode (D1) 32 that are connected in series to the load can be suitably used as the rectifier circuit unit 3. Parameters of these elements may be appropriately set according to, for example, the impedance of the power load (RL) 35.

As illustrated in FIG. 1, the inverter circuit unit 1 that supplies alternating-current power to the power transmitting coil (L1) 21 mainly includes a switching circuit 11 for converting direct-current power output from a direct-current power supply 13 into alternating-current power with a predetermined frequency, a high-frequency resonant circuit 12 that is connected to the direct-current power supply 13 in parallel to the switching circuit 11, an input inductor (LC) 18, a changeover switch (S2) 19, and an output capacitor (C1) 17 for forming a series filter in combination with the power transmitting coil (L1) 21.

The switching circuit 11 connected to the power transmitting coil (L1) 21 through the output capacitor (C1) 17 has a switching element (S1) 14 which is, for example, a gallium nitride N-channel MOS-FET, and a diode 15 is connected in inverse parallel to the switching element (S1) 14. In addition, a capacitance capacitor (CS) 16 is connected to the switching element (S1) 14. With this configuration, when the switching element (S1) 14 is in an off state, electric charges are accumulated in the capacitance capacitor (CS) 16. All of the electric charges accumulated in the capacitance capacitor (CS) 16 are discharged before the switching element (S1) 14 is changed to an on state. As a result, zero voltage switching (ZVS; see FIG. 8) can be achieved. However, the diode 15 may be omitted from the circuit configuration.

Further, the switching circuit 11 is connected in series to the direct-current power supply 13 through the input inductor (LC) 18, and the high-frequency resonant circuit 12 including a high-frequency resonant capacitor (C2) 12a and a high-frequency resonant inductor (L2) 12b is connected in parallel to the switching circuit 11 between the input inductor (LC) 18 and the switching circuit 11.

Then, the changeover switch (S2) 19 is provided such that a point between the high-frequency resonant capacitor (C2) 12a and the high-frequency resonant inductor (L2) 12b is short-circuited to the direct-current power supply 13. In other words, the changeover switch (S2) 19 is a switch that has one end connected to the direct-current power supply 13 and the other end connected to the high-frequency resonant capacitor (C2) 12a and the high-frequency resonant inductor (L2) 12b.

In addition, the high-frequency resonant inductor (L2) 12b according to the present invention has a sufficiently smaller inductance than the input inductor (LC) 18 (Lc>>L2). It is necessary to use a high-frequency resonant inductor that allows most of the current to flow to the high-frequency resonant inductor (L2) 12b rather than to the input inductor (LC) 18 when the changeover switch (S2) 19 is closed and turned on, which will be described below. Specifically, it is preferable that the inductance of the high-frequency resonant inductor (L2) 12b is set to about 1/10 to 1/100 of the inductance of the input inductor (LC) 18.

Next, for example, the operation of the inverter circuit unit 1 in a case where the changeover switch (S2) 19 is turned on and off will be described below. In addition, in the description of the operation of the inverter circuit unit 1, the rectifier circuit unit 3 does not have an input reactance, and the equivalent resistance of a power receiving side as seen from the inverter circuit unit 1 can be regarded as a power load (R'L) that is changed by the power load (RL) 35. Therefore, for convenience, since the circuit illustrated in FIG. 1 can be expressed as an equivalent circuit illustrated in FIG. 2, the following description will be made using the equivalent circuit illustrated in FIG. 2.

Figure 2:
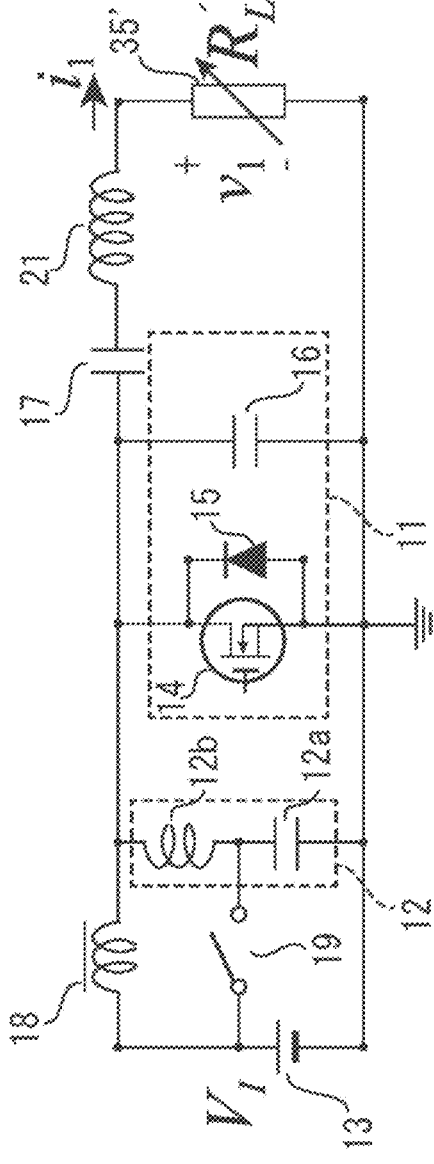
FIG. 2 is a diagram illustrating an equivalent circuit of the wireless power transfer circuit illustrated in FIG. 1.
Figure 3:
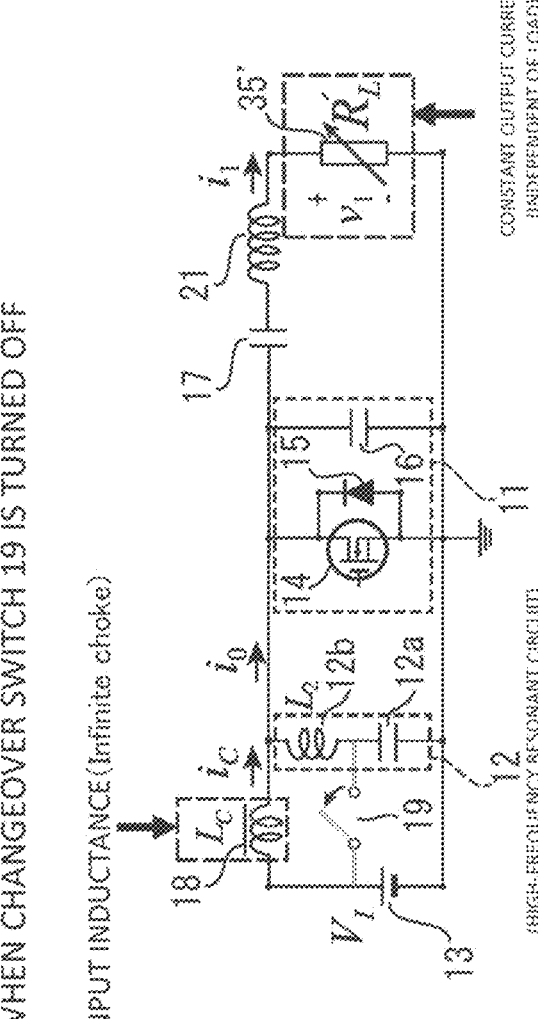
FIG. 3 is a diagram illustrating a state of constant current supply in the equivalent circuit when a changeover switch is opened.

FIG. 3 is a diagram illustrating an operating state when the changeover switch (S2) 19 is opened (OFF) in the equivalent circuit illustrated in FIG. 2. When the changeover switch (S2) 19 is opened (OFF), an input inductor current iC flows through the input inductor (LC) 18, and a high-frequency current i2 (not illustrated) flows through the high-frequency resonant circuit 12.

In this case, as illustrated in FIG. 5, for example, a duty ratio D of the switching element (S1) 14 is determined to be 0.415. For a correlation graph (design curve graph) between λB defined by ω×LB/R'L and γS defined by ω×CS×R'L, a constant of each element in the circuit is determined such that λB=1.92 and γS=0.177 are obtained from a proper point (represented by a star in FIG. 5) which is a load-independent Class-E point on the graph curve in a case where the duty ratio D is 0.415 as described above, which makes it possible to achieve an operation called Class-E load independence which outputs an almost constant current without depending on load fluctuations in the power load (R'L). Further, in a case where an operation called Class-E/F load independence is achieved, in the correlation graph illustrated in FIG. 5, the duty ratio D of the switching element (S1) 14 may be determined to be 0.300 (not illustrated in the correlation graph).

Furthermore, in the above definition formulas, ω is an operation angular frequency of the switching of the switching element (S1) 14. In FIG. 5, the power transmitting coil (L1) 21 is regarded as a front coil LA and a rear coil LB. For λB, the inductance of the rear coil LB close to the power load R'L is used. The reason why the power transmitting coil (L1) 21 is regarded as the front coil LA and the rear coil LB as described above is that, for convenience of circuit analysis, it is necessary to perform circuit analysis while separating a component (LA) that resonates with the output capacitor (C1) 17 at an operating frequency of 1 MHz and an inductive component (LB) causing an output current phase difference. In the circuit illustrated in FIG. 5, the output capacitor (C1) 17 and the front coil LA are perfectly tuned to the operating angular frequency ω, and the operating angular frequency ω satisfies sqrt (C1×LA).

Figure 4:
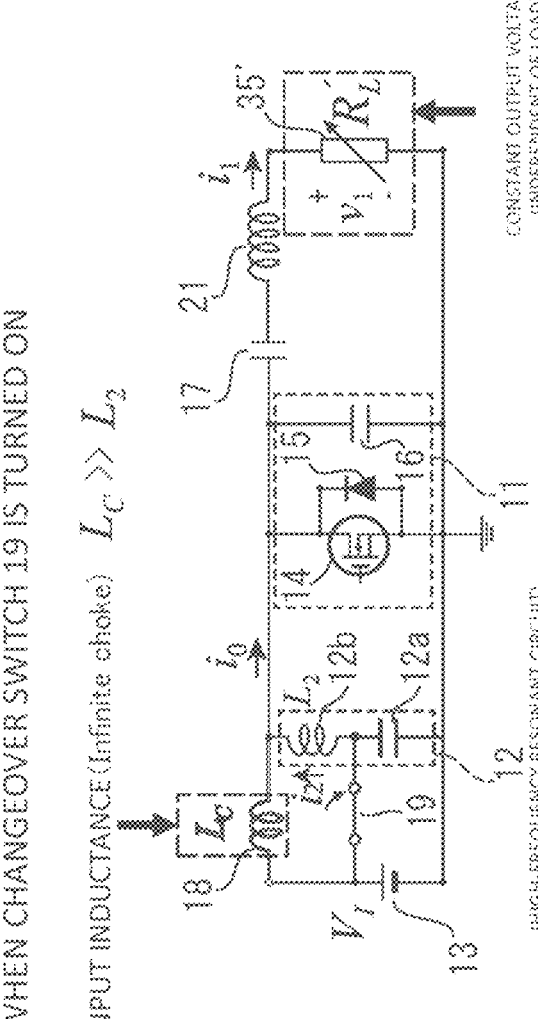
FIG. 4 is a diagram illustrating a state of constant voltage supply in the equivalent circuit when the changeover switch is closed.

Meanwhile, FIG. 4 is a diagram illustrating an operating state when the changeover switch (S2) 19 is closed (ON) in the equivalent circuit illustrated in FIG. 2. When the changeover switch (S2) 19 is closed (ON), the voltage applied to the high-frequency resonant capacitor (C2) 12*a* is clamped to a voltage VI of the direct-current power supply 13. Then, since the inductance of the high-frequency resonant inductor (L2) 12*b* is sufficiently smaller than the inductance of the input inductor (LC) 18 (Lc>>L2) as described above, most of the input current becomes i2 flowing through the changeover switch (S2) 19 and the high-frequency resonant inductor (L2) 12*b*. Therefore, the high-frequency resonant inductor (L2) 12*b* constitutes an apparent input inductance. As a result, the operation called Class-E load independence is achieved, and the output voltage V1 is almost constant regardless of load fluctuations in the power load R'L.

As described above, the method illustrated in FIG. 5 that determines the duty ratio DE and then calculates each parameter from the proper point in the correlation graph between λB and γS makes it possible to easily calculate proper parameters for achieving load-independent constant current supply and constant voltage supply.

Here, a design procedure for obtaining proper element values and parameters of the inverter circuit unit 1 according to the present invention will be described in more detail with reference to FIG. 7. First, as a circuit design procedure, the input voltage VI, the inductance of the power transmitting coil (L1) 21, the inductance of the input inductor (LC) 18, and a load resistance value are given. Proper values are given to the inductances of the power transmitting coil (L1) 21 and the input inductor (LC) 18 such that a resonant frequency and an RF choke are obtained. RE is given as the load resistance value in the case of a Class-E inverter for constant current supply, and REF is given as the load resistance value in the case of a Class-E/F inverter for constant voltage supply.

Then, as the first stage of the design, each element value and each parameter of the load-independent Class-E/F inverter for constant voltage supply are designed. At this time, the duty ratio DEF of the switching element (S1) 14 is given for the design. Then, the parameter γS, the parameter λB, and the parameter ω2 defined by the definition formulas illustrated in the table of FIG. 6 are derived according to the design theory of the load-independent Class-E/F inverter disclosed in a known document (S. Aldhaher, D. C. Yates and P. D. Mitcheson, "Load-Independent Class E/EF Inverters and Rectifiers for MHz-Switching Applications", IEEE Transactions on Power Electronics, vol. 33, no. 10, pp. 8270-8287 October 2018). Then, the element values of the capacitance capacitor (CS) 16 and the output capacitor (C1) 17, the inductances of the front coil LA and the rear coil LB, and the resonant frequency by the high-frequency resonant inductor (L2) 12*b* and the high-frequency resonant capacitor (C2) 12*a* can be uniquely calculated from these derived parameters γS, λB, and ω2.

Next, as the second stage of the design, the load-independent Class-E inverter for constant voltage supply is designed. At this time, it is necessary that the value given in the initial stage is used as the inductance of the power transmitting coil (L1) 21 and the element values of the capacitance capacitor (CS) 16 and the output capacitor (C1) 17 are the same as those in the first stage. As described above, it is possible to uniquely calculate the duty ratio DE of the switching element (S1) 14 of the class-E inverter that satisfies the load-independent conditions while satisfying the conditions of the load-independent Class-E/F inverter and the inductance of the high-frequency resonant inductor (L2) 12*b*.

Specifically, the duty ratio DE is determined using the design curve graph illustrated in FIG. 5 by dimensionless parameters in which the horizontal axis is the parameter λB and the vertical axis is the parameter γS. In other words, as illustrated in the design curve graph of FIG. 5 (also illustrated in FIG. 6), the position on the design curve graph corresponding to the parameter λB=1.92 (horizontal axis) and the parameter γS=0.177 (vertical axis), which are the design values calculated in the design stage (first stage) of the load-independent Class-E/F inverter, is the position of the star illustrated in FIG. 5.

Here, curves in the design curve graph illustrated in FIG. 5 indicate the design values of the rear coil LB and the capacitance capacitor (CS) 16 at the duty ratio DE of the switching element (S1) 14 of the Class-E inverter. In this case, it can be seen that the design curve passes through the star only when the duty ratio DE is 0.415.

Therefore, the duty ratio DE of the load-independent Class-E inverter is determined to be 0.415. As illustrated in FIG. 6, it is possible to derive a parameter OS from the Class-E load-independent conditional expression described in the above-mentioned known document on the basis of the determined duty ratio DE. The inductance of the high-frequency resonant inductor (L2) 12*b* is determined by the derived parameter ωS. In addition, it is also possible to determine the capacitance of the high-frequency resonant capacitor (C2) 12*a* from the determined inductance of the high-frequency resonant inductor (L2) 12*b* and the resonant frequency calculated in the design stage (first stage) of the load-independent Class-E/F inverter. Therefore, all element values are determined.

In other words, according to the present invention, as described above, in order to turn on and off the changeover switch (S2) 19 to satisfy constant current supply (CC mode) and constant voltage supply (CV mode) called load independence, the element values (synonymous with the constants of each element) of the circuit are not set arbitrarily, but need to be determined to satisfy all of the conditions described in the above-mentioned known document, under which the constant current supply (CC mode) that enables the load-independent operation can be performed, and the above-mentioned conditions under which the constant voltage supply (CV mode) that enables the load-independent operation can be performed. In the present invention, "optimizing the constants of the element values" means "calculating the element values so as to satisfy the above-mentioned conditions". However, the design procedure described above is only an example, and a method for deriving the element values satisfying all of the conditions is not limited to the above-described design procedure. It goes without saying that other design procedures are used to derive the element values satisfying all of the conditions.

Figure 7:
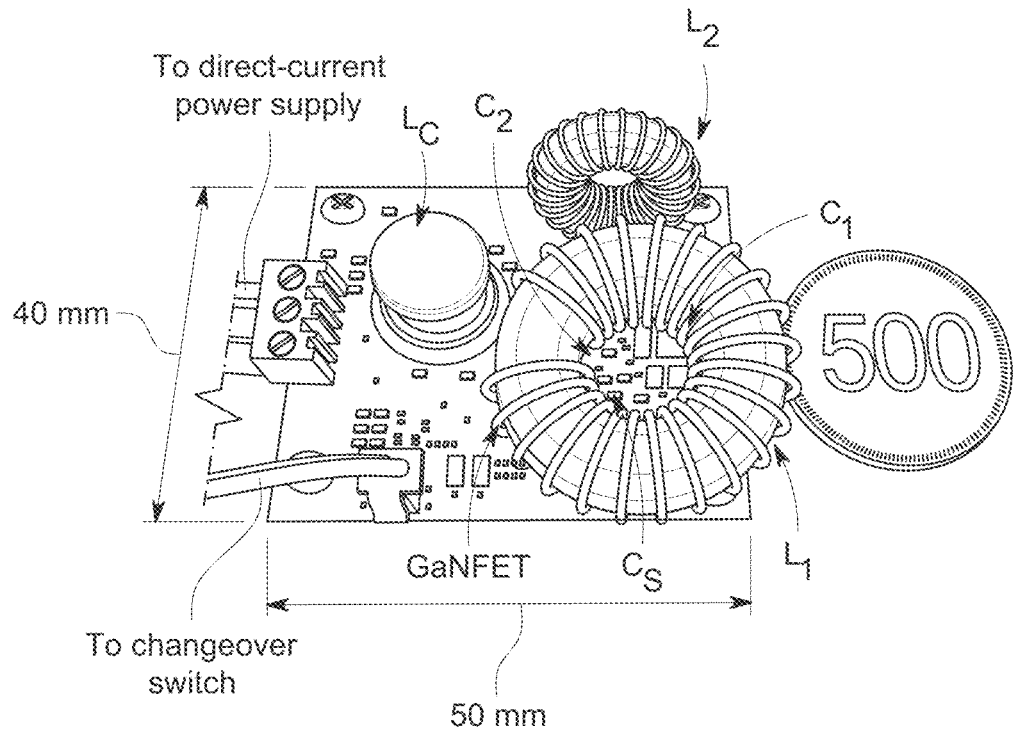
FIG. 7 is a diagram illustrating an appearance photograph of a prototype inverter circuit and design values and measured values of each element used in the inverter circuit.

In addition, the element values derived by the design procedure described above are only design values, and there may be errors between the derived element values and the element values of the actual components as illustrated in FIG. 7 which will be described below. In other words, the efficiency of a Class-E circuit used under a high-frequency operation is robust against variations in element values due to individual differences in elements. Therefore, even when there are variations in the element values, the influence of the efficiency and the like on the circuit operation is limited. For this reason, in a range in which sufficient performance is obtained in terms of efficiency and the like, it is possible to tolerate errors from the design values.

(Embodiment) FIG. 7 illustrates a prototype of an inverter circuit board to which the inverter circuit according to the present invention is applied. The inverter circuit board is a small board with a size of 40 mm×50 mm. As illustrated in FIG. 7, the board is provided with three coils of the input inductor (LC) 18, the high-frequency resonant inductor (L2) 12b, and the power transmitting coil (L1) 21, and the capacitance capacitor (CS) 16, the output capacitor (C1) 17, and the high-frequency resonant capacitor (C2) 12a are mounted as ceramic capacitors on a surface of the board covered by the largest power transmitting coil (L1) 21.

The inverter circuit board is wired and connected to the direct-current power supply 13 of 24 V through three terminal portions that are provided near the input inductor (LC) 18, and is wired and connected to the manual changeover switch (S2) 19 through two terminal portions that are provided near the power transmitting coil (L1) 21. The load-independent constant current operation and the load-independent constant voltage operation can be switched by manually turning on and off the changeover switch (S2) 19.

In addition, for the prototype inverter circuit board, a design operating frequency fs was 1 MHz, the input direct-current voltage VI was 24.0 V, the inductance of the input inductor (LC) 18 was 100 μH, the inductance of the power transmitting coil (L1) 21 was 11.9 μH, the inductance of the high-frequency resonant inductor (L2) 12b was 3.24 H, the capacitance of the capacitance capacitor (CS) 16 was 5.50 nF, the capacitance of the output capacitor (C1) 17 was 2.43 nF, and the capacitance of the high-frequency resonant capacitor (C2) 12a was 2.70 nF. After the elements were mounted, the deviation from the design value of each element was measured using the prototype inverter circuit board. As illustrated in FIG. 7, there was almost no deviation from the design value. Here, the inductance of the high-frequency resonant inductor (L2) 12b was about 1/31 of the inductance of the input inductor (LC) 18.

Figure 8:
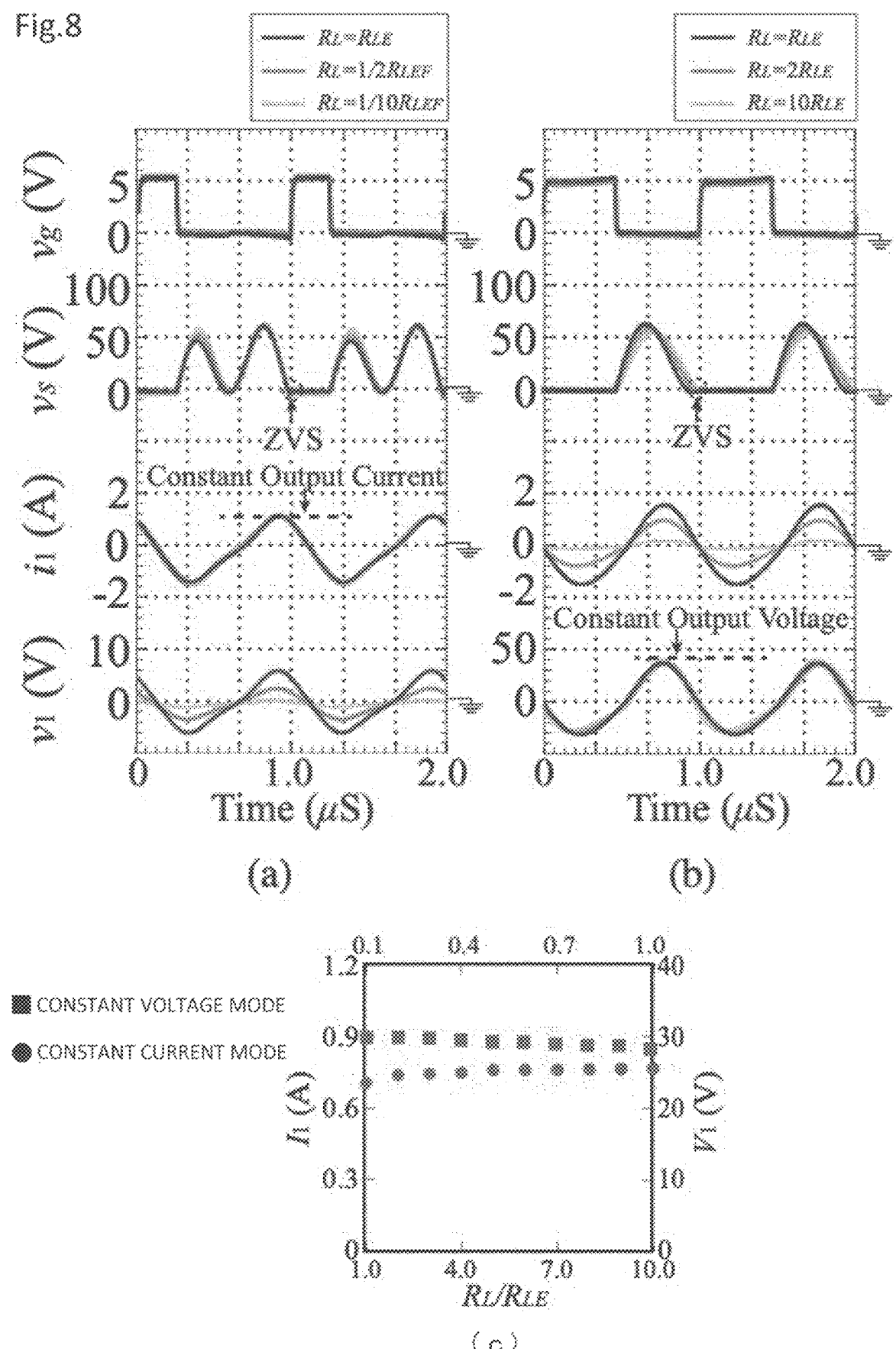
FIG. 8 is a diagram illustrating a characteristic graph of the prototype inverter circuit.

FIG. 8 illustrates measurement results of a voltage Vg applied to the switching element (S1) 14, a voltage VS applied to the diode 15 connected in inverse parallel to the switching element (S1) 14, and the voltage V1 and a current i1 applied to the power load R'L for the prototype inverter circuit board.

FIG. 8A is a graph illustrating the measurement results when the changeover switch (S2) 19 is opened (OFF). As illustrated in FIG. 8A, it can be seen that, in a case where the changeover switch (S2) 19 is opened (OFF), when the power load R'L changes to 1/10, 1/2, or 1/1 of R (LEF), the voltage V1 applied to the power load R'L changes significantly, but the current i1 hardly changes, which results in constant current supply. In addition, it can be seen that, when switching is performed by the switching element (S1) 14, both the voltage VS and the voltage Vg are 0 V and zero voltage switching (ZVS) is achieved.

Furthermore, as illustrated in FIG. 8C, it can be seen that, in a case where the changeover switch (S2) 19 is opened (OFF) to set the constant current mode, even when measurement is performed while finely changing the power load R'L to 1/10 to 1/1 of R (LEF), the current I1 flowing through the power load R'L hardly changes and the load-independent constant current operation is achieved.

Further, FIG. 8B is a graph illustrating the measurement results when the changeover switch (S2) 19 is closed (ON). As illustrated in FIG. 8B, it can be seen that, in a case where the changeover switch (S2) 19 is closed (ON), when the power load R'L changes to 1/10, 1/2, or 1/1 of R (LEF), the current i1 applied to the power load R'L changes significantly, but the voltage V1 hardly changes, which results in constant voltage supply. In addition, it can be seen that, when switching is performed by the switching element (S1) 14, both the voltage VS and the voltage Vg are 0 V and zero voltage switching (ZVS) is achieved.

Furthermore, as illustrated in FIG. 8C, it can be seen that, in a case where the changeover switch (S2) 19 is closed (ON) to set the constant voltage mode, even when measurement is performed while finely changing the power load R'L to 1/10 to 1/1 of R (LEF), the voltage V1 applied to the power load R'L hardly changes, and the load-independent constant voltage operation is achieved.

As described above, according to the inverter circuit of the present invention, the changeover switch (S2) 19 can be turned on and off to perform both the constant current supply and the constant voltage supply using the single switching element (S1) 14, and it is possible to simplify the inverter circuit and to reduce the size (weight) and cost of the inverter circuit.

Figure 10:
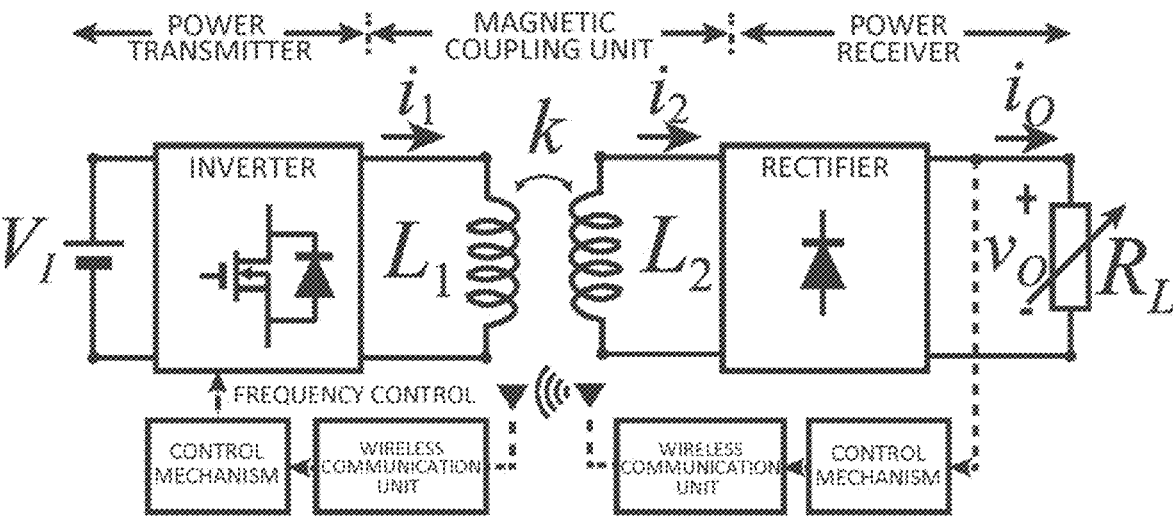
FIG. 10 is a diagram illustrating a configuration of a wireless power transfer device according to the related art.

In particular, load-independent constant current supply and constant voltage supply can be achieved by setting the inductance of the high-frequency resonant inductor (L2) 12b to be sufficiently smaller than the inductance of the input inductor (LC) 18 and optimizing the parameters of each element constituting the inverter circuit using the design method illustrated in FIG. 5. It is possible to omit a configuration related to control for suppressing changes in the voltage and the current according to changes in the power load RL, specifically, a configuration for transmitting information of the voltage and current applied to the power load RL from the power receiving side including the power receiving coil (L3) 22 and the rectifier circuit unit 3 to the inverter circuit unit 1 using wireless communication or the like as described in the example according to the related art illustrated in FIG. 10 and for performing control to suppress changes in the voltage and the current using the transmitted voltage and current. Therefore, it is possible to further simplify the inverter circuit and to further reduce the size (weight) and cost of the inverter circuit.

In addition, a frequency range permitted for the wireless power transfer (WPT) is determined by the laws of each country in order to prevent electromagnetic interference problems. In Japan, as mentioned above, a very narrow band, such as the industrial, scientific, and medical frequency band (ISM band), specifically, a band of 6.765 to 6.795 MHz or a band of 13.553 to 13.567 MHz is allocated. As described in the example according to the related art illustrated in FIG. 10, it is very difficult to receive the information of the voltage and current applied to the power load RL from the power receiving side and to perform control to change the frequency in the narrow band to supply a constant voltage and a constant current. However, according to the present invention, it is also possible to achieve constant current supply and constant voltage supply using one frequency, without changing these frequencies.

Furthermore, as the frequency used for the wireless power transfer (WPT) is higher, the influence of, for example, delays in wireless communication related to control information including fluctuations caused by carrier sense or the like is greater due to the increase in the frequency, and it is difficult to identify optimal control parameters related to voltage control and current control. Therefore, it is difficult to achieve appropriate voltage control and current control. In addition, since a switching loss increases as the frequency increases, a soft switching operation is essential to achieve high efficiency. As a result, a new problem that a constant output and soft switching need to be simultaneously guaranteed also arises, which complicates a control system and makes it difficult to reduce the size (weight) and cost of the circuit and to simplify the circuit. However, according to the present invention, as described above, since an operation by zero voltage switching (ZVS) is possible, it is possible to effectively suppress a switching loss at a high frequency. Therefore, it is possible to achieve high efficiency in a high-frequency operation and to perform a load-independent constant current operation and a load-independent constant voltage operation, which makes it possible to significantly simplify the control system. As a result, it is also possible to simplify the inverter circuit and to reduce the size (weight) and cost of the inverter circuit.

The embodiment of the present invention has been described above with reference to the drawings. However, a specific configuration is not limited to the embodiment, and the present invention also includes modifications and additions in the range that do not deviate from the scope of the present invention.

For example, in the above-described embodiment, the mode in which power transfer is performed in a disconnected state by magnetic field coupling using magnetic field resonance is given as an example. However, the present invention is not limited to this. As the power transfer method in the disconnected state, power transfer may be performed using electric field resonance, or coupling portions may be coupled by a transformer to form an isolated resonant converter in a connected state.

In addition, in the above-described embodiment, the mode in which the changeover switch (S2) 19 is manually operated to perform switching is given as an example. However, the present invention is not limited to this. As illustrated in a modification example of FIG. 9, the switch may be configured to be automatically turned on and off. In other words, as described in the problems to be solved by the present invention, in the lithium-ion secondary batteries which are widely used as the secondary batteries, it is important to perform constant current charging in the initial stage of charging and to perform constant voltage charging from the middle of charging, from the viewpoint of preventing deterioration.

For this reason, in a case where the power load is the lithium-ion secondary battery, the changeover switch (S2)

19 needs to be changed from OFF to ON in the middle of charging to change the mode from the load-independent constant current mode to the load-independent constant voltage mode. However, when the constant current mode is manually changed to the constant voltage mode, the user's convenience is reduced. Therefore, in the modification example illustrated in FIG. 9, the constant current mode is automatically changed to the constant voltage mode.

Figure 9:
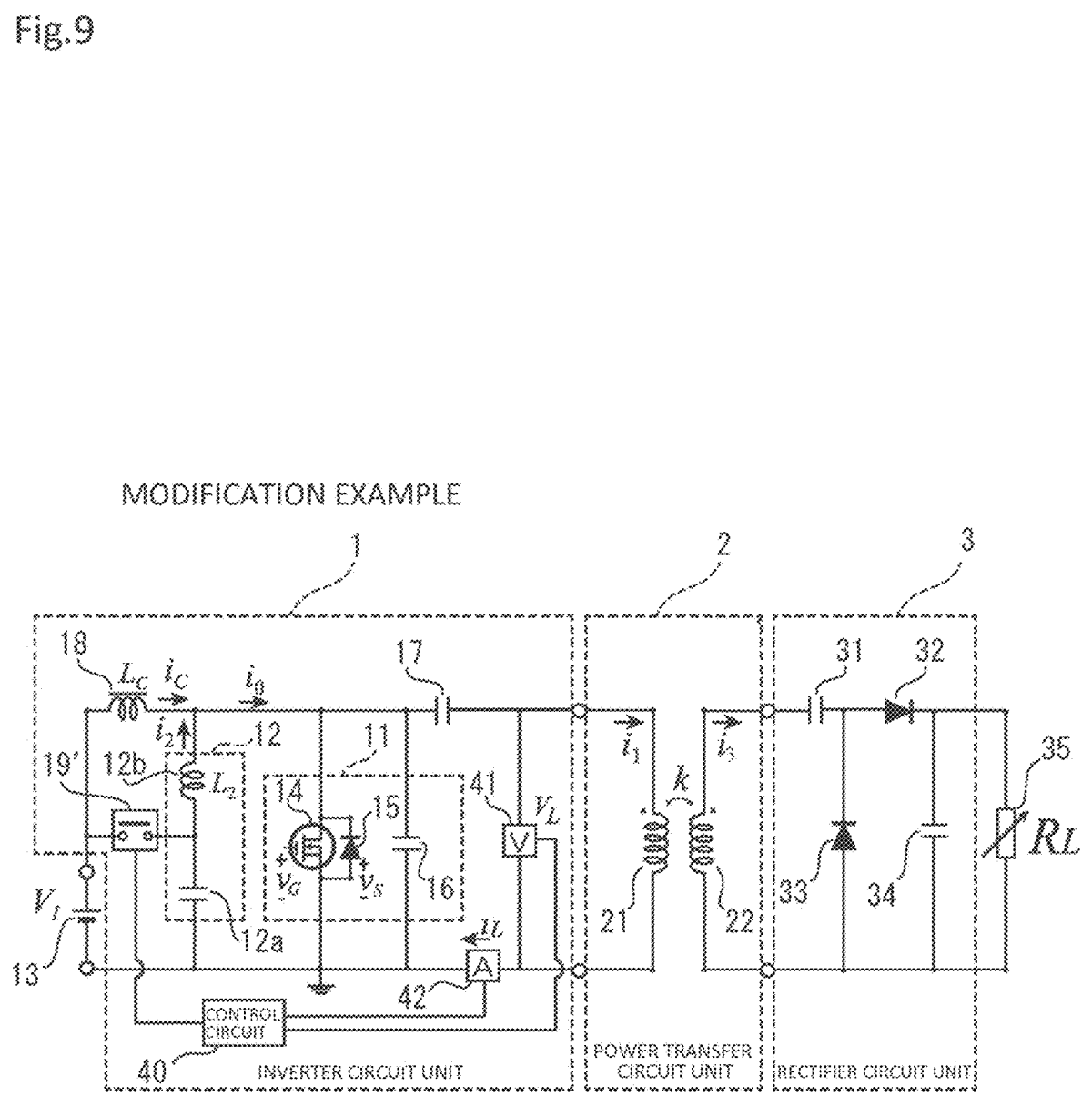

Specifically, as illustrated in FIG. 9, to the inverter circuit unit 1, a voltage sensor 41 that detects a voltage VL applied to the power transmitting coil (L1) 21, a current sensor 42 that detects a current iL flowing through the power transmitting coil (L1) 21, and a control circuit 40 which is, for example, a microcomputer, is connected to the voltage sensor 41 and the current sensor 42, and can control an electric switch (S2') 19' that is electrically switchable are provided. When the control circuit 40 determines that the voltage VL detected by the voltage sensor 41 and the current iL detected by the current sensor 42 satisfy switching conditions including a preset switching voltage VL and a preset switching current iL, the control circuit 40 switches the state of the electric switch (S2') 19' from an ON state at the start of charging to an OFF state.

This makes it possible to improve the convenience of charging the lithium-ion secondary battery. Further, in particular, since it is not necessary to provide control information communication means for receiving control information for turning on and off the electric switch (S2') 19' from the power receiving side including the power receiving coil (L3) 22 and the rectifier circuit unit 3, it is possible to avoid losing the effect of removing the control information communication means by the formation of the load-independent type, which is preferable. However, the present invention is not limited to this. In order to more accurately check the voltage and current supplied to the lithium-ion secondary battery and to turn on and off the electric switch (S2') 19', a voltage sensor and a current sensor may be provided on the power receiving side, and information of the voltage and the current detected by the voltage sensor and the current sensor may be transmitted as control information to the inverter circuit by transmitting means.

In addition, in the above-described embodiment, the mode in which the gallium nitride MOS-FET is used as the switching element of the inverter is given as an example. However, the present invention is not limited to this. Of course, MOS-FETs other than the gallium nitride MOS-FET may be used, and the switching elements of these inverters may be appropriately selected considering the voltage to be used, efficiency, and the like.

Further, in the above-described embodiment, the frequency according to the embodiment is 1 MHz. However, the present invention is not limited to this. Of course, the frequency may be a frequency in the above-mentioned industrial, scientific, and medical frequency band (ISM band), and it goes without saying that the frequency is not limited to these high frequencies and may be 85 KHz which is a vehicle charging frequency. In other words, the frequency to which the present invention is applied is not limited to the high frequencies, but may also be low or medium frequencies.

Furthermore, in the above-described embodiment, the mode in which the coils, the capacitors, and the switching element are disposed as illustrated in FIG. 7 is given as an example. However, the present invention is not limited to this. The disposition of the coils, the capacitors, and the switching element may be appropriately determined considering interference, heat generation, and the like.

Moreover, in the above-described embodiment, since secondary battery charged with a direct current is assumed as the power load RL, the rectifier circuit unit 3 is provided on the power receiving side. However, the present invention is not limited to this. When the power load RL on the power receiving side needs to be supplied with an alternating current, the rectifier circuit unit 3 may not be provided.

In addition, in the above-described embodiment, the mode in which the inverter circuit unit 1 serving as the inverter circuit according to the present invention is applied to the wireless power transfer circuit M is given as an example. However, the present invention is not limited to this. As described above, the inverter circuit unit 1 can also be used as an alternating-current power supply (not limited to a high frequency) that can output a constant current or a constant voltage.

INDUSTRIAL APPLICABILITY

The present invention can potentially be applied to wireless power supply and resonant converters for charging batteries. In addition, the present invention can potentially be applied to the charging of future electric storage devices such as supercapacitors. The technology of the present invention is theoretically independent of the power level. Therefore, the technology of the present invention can be applied as a charging circuit to any application that uses the electric storage device.

In addition, for standards for short-distance charging and long-distance power supply, since the technology of the present invention is an invention related to the content of the power transfer circuit which is one layer lower than these standards, it does not affect each of the above-described standards. Therefore, the technology of the present invention can also be used in each of the above-described standards.

REFERENCE SIGNS LIST

M Wireless power transfer circuit
1 Inverter circuit unit
2 Power transfer circuit unit
3 Rectifier circuit unit
11 Switching circuit
12 High-frequency resonant circuit
12*a* High-frequency resonant capacitor
12*b* High-frequency resonant inductor
13 Direct-current power supply
14 Switching element
15 Diode
16 Capacitance capacitor
17 Output capacitor
21 Power transmitting coil
22 Power receiving coil
31, 34 Capacitor
32, 33 Diode
35 Power load

The invention claimed is:

1. An inverter circuit for connection to a direct-current power supply and converts direct-current power outputted from the direct-current power supply into alternating-current power, comprising:

an input inductor configured for connection in series between the direct-current power supply and a switching circuit partially constituting the inverter circuit;

a resonant circuit configured for connection in parallel to the direct-current power supply together with the switching circuit, the resonant circuit including a resonant capacitor and a resonant inductor; and a switch having a first end configured for connection to the direct-current power supply and a second end configured for connection to the resonant capacitor and the resonant inductor, wherein the resonant inductor and the input inductor are connected in parallel to the switch, and the switch is a manual changeover switch configured to be manually operated to perform switching.

2. The inverter circuit according to claim 1, wherein an inductance of the resonant inductor is smaller than an inductance of the input inductor, and a constant of each element constituting the inverter circuit is optimized such that constant current supply and constant voltage supply are possible without depending on a fluctuation in a power load supplied with the alternating-current power output from the inverter circuit.

3. A wireless power transfer circuit comprising:

the inverter circuit according to claim 2; and a power transfer circuit configured to transfer power in a disconnected state using magnetic field resonance or electric field resonance.

4. An inverter circuit for connection to a direct-current power supply and converts direct-current power outputted from the direct-current power supply into alternating-current power, comprising:

an input inductor configured for connection in series between the direct-current power supply and a switching circuit partially constituting the inverter circuit;

a resonant circuit configured for connection in parallel to the direct-current power supply together with the switching circuit, the resonant circuit including a resonant capacitor and a resonant inductor; and a switch having a first end configured for connection to the direct-current power supply and a second end configured for connection to the resonant capacitor and the resonant inductor, a voltage sensor configured to detect a voltage of the alternating-current power, and a current sensor configured to detect a current of the direct-current power, a control circuit configured to perform arithmetic processing based on the voltage detected by the voltage sensor and the current detected by the current sensor to output a control signal, wherein the resonant inductor and the input inductor are connected in parallel to the switch, and the switch is switched in accordance with the control signal from the control circuit.

* * * * *